Nov. 8, 1932.  J. RUBINSTEIN ET AL  1,886,978
INTERNAL COMBUSTION ENGINE
Filed March 23, 1923   3 Sheets-Sheet 3

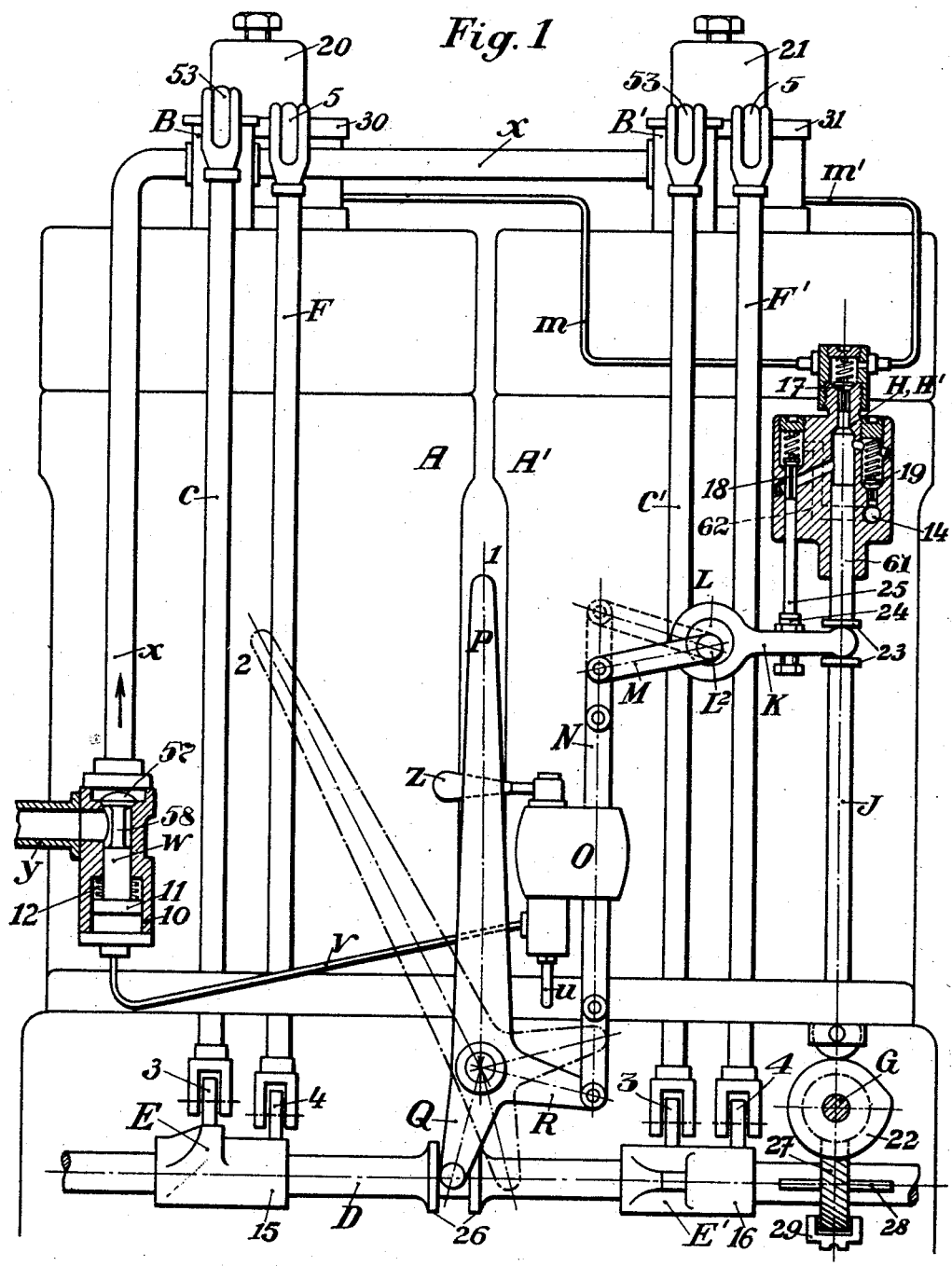

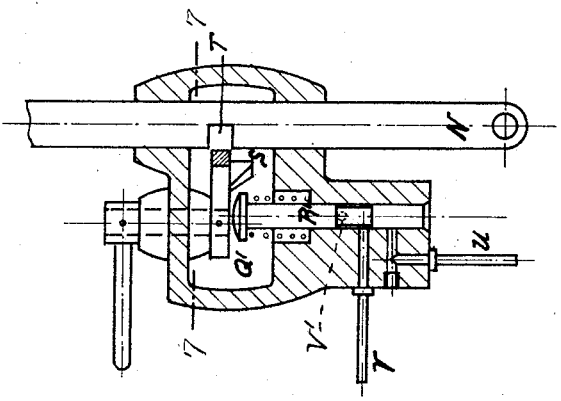
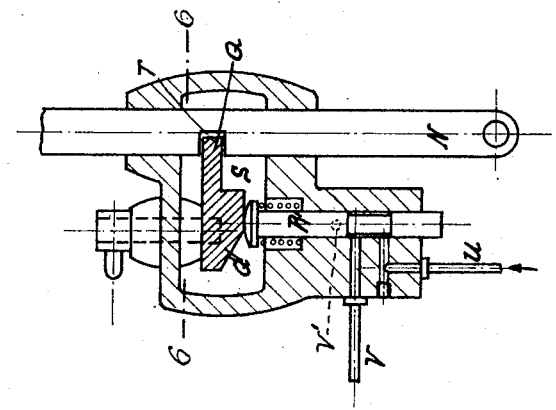
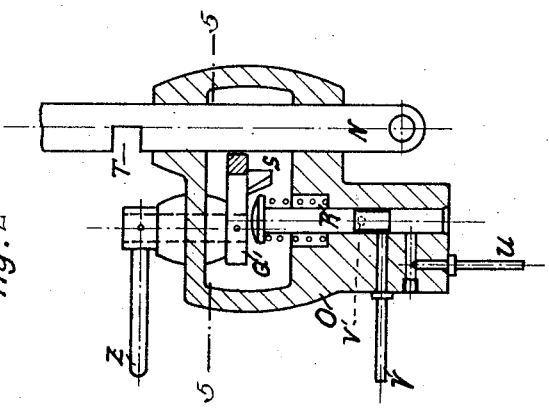
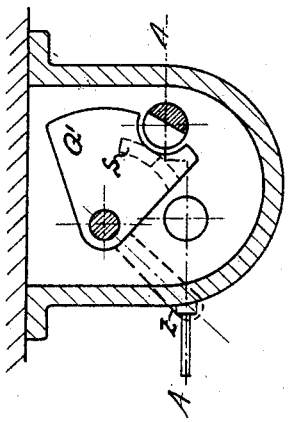
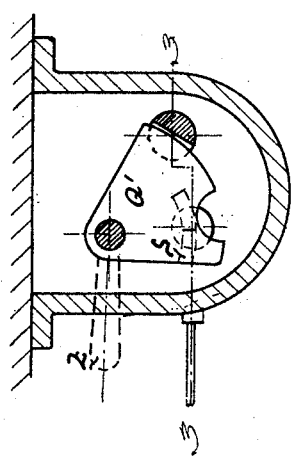
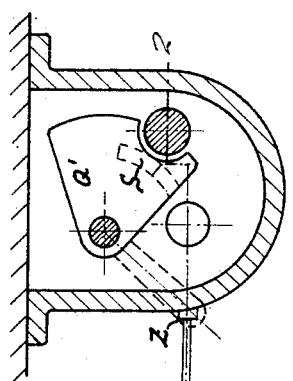

Inventors:
Jacques Rubinstein,
Victor Heidelberg,
Emil Unhorn,
Wilhelm Dahners.

Patented Nov. 8, 1932

1,886,978

UNITED STATES PATENT OFFICE

JACQUES RUBINSTEIN, OF COLOGNE-MULHEIM, VICTOR HEIDELBERG, OF BENSBERG, NEAR COLOGNE, EMIL UHLHORN, OF COLOGNE, AND WILHELM DAHNERS, OF COLOGNE-MULHEIM, GERMANY

INTERNAL COMBUSTION ENGINE

Application filed March 23, 1923, Serial No. 627,209, and in Germany June 22, 1922.

This invention relates to internal combustion engines of the type in which the fuel charge supplied by the pressure of the fuel pump at every feeding stroke of the same is admitted into the combustion chamber by a self-controlling fuel nozzle without the aid of compressed air.

The invention has reference particularly to novel and simple starting, stopping and locking means which permit engines of the type mentioned to be readily and safely started and stopped.

According to the invention, these objects are attained by providing an engine comprising novel, simple and effective means whereby the compressed air starting connections, the fuel injecting apparatus, and the camshaft setting, are all so interlocked as to render impossible any error in the sequence of operations in starting, running, or stopping, whereby undue strains, injury to the engine, or waste of fuel might be occasioned. The subject-matter of the present application is especially adapted for use in connection with a fuel injection valve and a piston of the form disclosed by our copending divisional application, Serial No. 20,225, filed April 2, 1925.

In order to allow the invention to be more fully understood, it will now be described in detail with reference to the accompanying drawings in which:

Fig. 1 is a somewhat diagrammatic elevation illustrating the invention as applied to a two-cylinder engine, the air-starting check valve and fuel pump being shown in section;

Figs. 2, 3 and 4 are sectional views partly in elevation, of details of the engine control means, and respectively showing the latter in working, starting and stopped positions;

Figure 8:
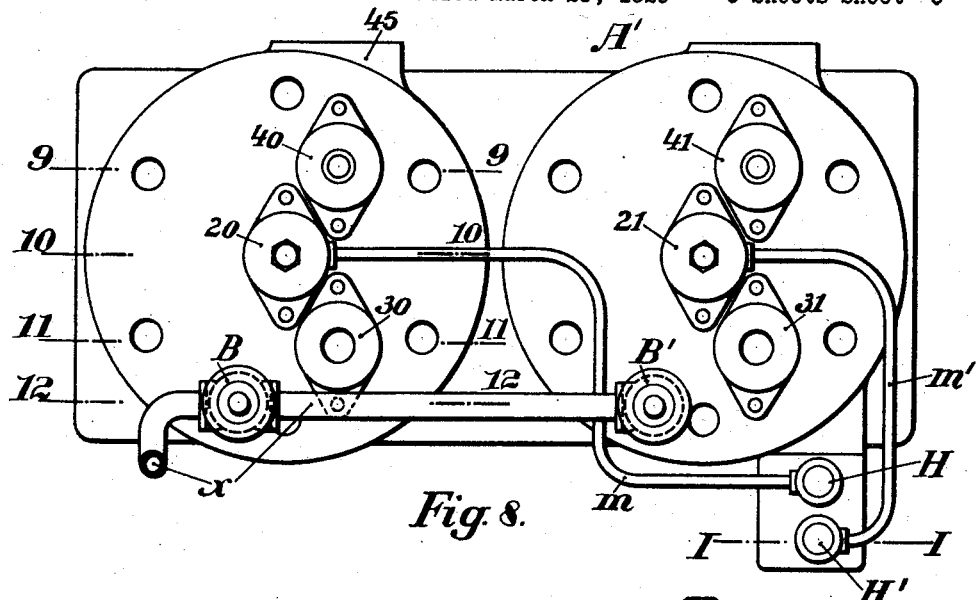
Figures 9, 10:
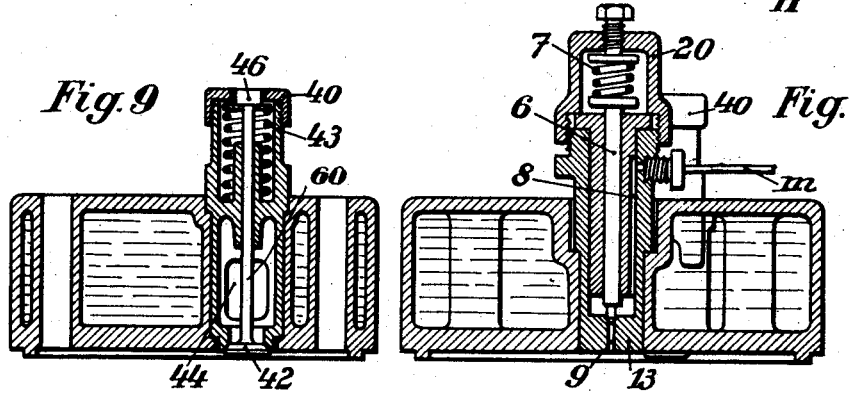
Figures 11, 12:
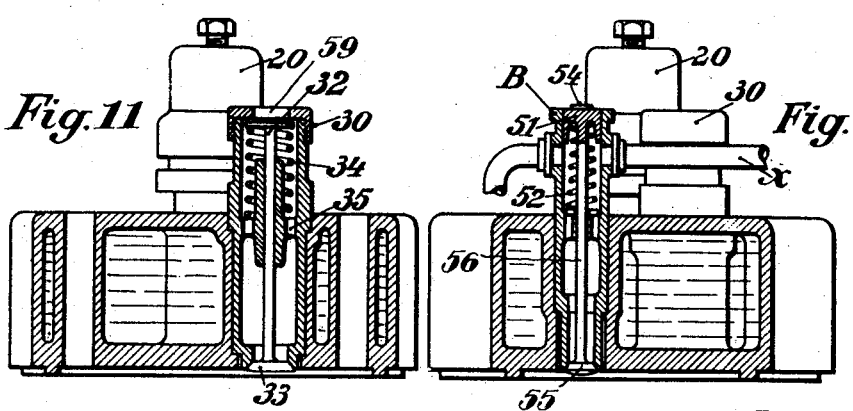

Figs. 5, 6 and 7 are sections on the lines 5—5, 6—6 and 7—7 respectively of Figs. 2, 3 and 4, the latter figures corresponding to sections on the lines 2—2, 3—3 and 4—4 respectively of Figs. 5, 6 and 7;

Fig. 8 is a plan of the engine cylinders according to Fig. 1; and

Figs. 9 to 12 are respectively sections on the lines 9—9 to 12—12 of Fig. 8.

As illustrated, the engine cylinder A is provided with the air inlet valve 30, the fuel injection valve 20, and the exhaust valve 40, while the cylinder A' is provided with the air inlet valve 31, fuel injection valve 21, and exhaust valve 41, these valves being of more or less common construction and grouped in a known manner with relation to the cylinder heads.

Herein for injecting fuel into the cylinder A a fuel pump H is provided, and for the cylinder A' a fuel pump H', these fuel pumps being mounted in a single block (Fig. 8), but otherwise being of duplicate construction, the latter shown by Fig. 1 in which the fuel pump is represented as a section on the line 1—1 of Fig. 8.

The engine is further provided with a cam shaft D for operating the starting valves B and B' and exhaust valves 40 and 41.

The engine is also provided with starting mechanism hereinafter more fully described which comprises a manually operated lever P for effecting the operation of the fuel pumps and compressed air check valve W and for shifting the cam shaft D longitudinally for effecting the operation of the starting and exhaust valves.

The starting valves B and B' are similarly constructed, and as shown (Fig. 12) each comprises a head 55 balanced by a piston 51 carried on the end of the valve stem 56, a spring 52 normally acting to keep the valve 55 on its seat.

As shown, the casings for the starting valves are connected by the pipes $x$ to a check valve casing 10 to which compressed air is admitted from a receiver (not shown) through a pipe $y$. The check valve W comprises a head 57 connected to a piston 11 by a valve stem 58, the spring 12 normally holding the valve on its seat. Means hereinafter described are provided for admitting compressed air through a pipe V to beneath the piston 11 for opening the check valve when the engine is being started. In the starting position of the cam shaft D the cam E lifts the roller 3 and associated push rod C for operating a rocker arm 53 for engaging the end 54 of the starting valve B and opening it, under which conditions the compressed air is admitted to the engine cylinder for actuating the engine during the starting operation. In a similar manner the starting valve B' is operated by means of the cam E' and push rod C'. As the mechanism including the rocker arms 53 for operating the starting valves B and B' is of common construction in the art it is believed unnecessary further to describe the same.

During normal running of the engine air is supplied to the engine cylinders through the suction operated air inlet valves 30 and 31. As shown (Fig. 11) the air inlet valves comprise a puppet head 33 with an upwardly extended valve stem 32, the valve being normally held on its seat by a spring 34. When the valve is open admission of atmospheric air is provided through the orifice 59 in the cap 30 and the passages 35.

The exhaust valves 40 and 41 as shown (Fig. 9) comprise puppet valves 42 having valve stems 60 with heads 46 operated upon by rocker arms 5 actuated by the push rods F and F' at the lower ends of which are rollers 4 lifted by the cams 15 and 16, the push rods and rocker arms during the exhaust periods being effective to compress the springs 43 and open the valves 42 to permit the exhaust gases to escape by way of the passages 44.

The fuel injection valves 20 and 21 (Fig. 10) are of common construction. Oil is supplied from the fuel pumps H and H' to the valves by the tubes m and m', the pressure of the oil flowing through the grooves 8 being effective to act on the lower ends of the valve stems 6 and compress the springs 7 to inject oil through the orifices $g$ in the nozzles 13.

The fuel pumps H and H' are of common construction and comprise the plungers 61, suction inlets 14, inlet check valves 19, automatic discharge valves 17, and overflow or by-pass valves 18 controlled by the stems 25 and discharging into the suction line through the passage 62.

The plungers 61 herein are extended downward by means of tappets J, the latter actuated by cams 22 on a shaft G driven in timed relation with the cam shaft. Collars 23 on the tappets J actuate rock levers K which are oscillatively mounted on eccentrics L, the latter supported on a horizontal rock shaft $L^2$. The rock shaft $L^2$, which may be mounted on the engine frame in any suitable manner, may be rotated through a small arc by means of an arm M actuated by a vertical rod N. By rotating the shaft $L^2$ the centers of oscillation of the arms K may be adjusted vertically. About the middle portions of the lengths of the arms K are set screws 24 capable, when the eccentrics L are in their uppermost positions, of engaging the stems 25 of the by-pass valves 18 of the fuel pumps, but when said eccentrics are lowered being out of contact with said stems.

The vertical rod N, whereby the above adjustment is accomplished, passes through the casing O of a valve and control mechanism in a manner and for purposes to be hereinafter described, and is pivoted at its bottom to the lower arm R on the lever P. Attached to the lever P is another arm Q which is between a pair of collars 26 on the cam shaft D, whereby manual movement of the lever P from its full line to its dotted line position in Fig. 1 is effective to shift the cam shaft D to the left and raise the arm N.

The valve O includes a starting lever Z which rigidly carries in the interior of the casing O a segment Q' which is provided with a cam S and adapted to act both on the stop rod N and on a compressed air admission valve R' which forms another part of the starting mechanism. When this mechanism is in the working position as shown in Figs. 2 and 5, and in the stop position as shown in Figs. 7 and 8, the starting lever Z will be locked in the position in which the supply pipe U for the compressed air is closed by the admission valve R'. In the starting position illustrated by Figs. 3 and 6, however, the admission valve R' is held down in its open position by the cam S of the locking segment Q' so that compressed air will pass from the pipe U into the pipe V; at the same time the segment Q' has entered a notch T of the pump stop rod N, thus locking the latter and consequently the change-over lever P against any movement.

The remote control of the intermediate check valve W by means of the manually operated valve O permits the manual control levers Z and P to be conveniently located close together, while avoiding undue length or needless curvature in the main air pipe x. It also permits the use of a small, easily moved lever on the valve O.

The solid lines of Fig. 1, and Figs. 4 and 7, show the parts in stopped position, with the camshaft D so placed as to bring the cams E and E' into operative relation to the push-rods C and C' of the air starting valves B and B', respectively, the rod N and arm M lowered, and the eccentric L raised. The cam S is out of contact with the admission valve R' so that the pipe V is vented to the atmosphere by a port V' suitably spaced above the pipe V and extending perpendicularly to the plane of Fig. 4 and below the plane of Fig. 7, hence not shown, and the admission pipe U is closed. By means of the lever Z the sector Q' may be moved clockwise through the notch T into the starting position of Figs. 3 and 6, and the initiation of such movement will lock the rod N, thus preventing the feed of fuel to the cylinders, as will be explained more fully below. In case the lever P is moved before the lever Z, no harm can be done, for the reason that such movement will lock the sector Q' and prevent the admission of air to the intermediate valve W and so to the cylinders;

consequently the engine cannot be started except with the rod N in the no-feed position.

In order to change-over from the stop position to the starting position, it is only necessary to move the starting lever Z from the position illustrated in Figs. 4 and 7 into the position illustrated by Figs. 3 and 6. The valve R' being thereby depressed and communication established between the pipes U, V, compressed air will flow into the casing of the intermediate valve W and drive its piston upwards thus opening this valve. Thereby, compressed air will be admitted from the receiver (not shown) and the pipe y into the pipe X from which latter it will flow to the starting valves B, B'; the engine will thus be started. In this position, the rod N and the change-over lever P are locked against movement by the engagement of the segment Q' with the notch T of the rod N, so that the fuel pumps cannot be thrown in.

The working position is established by first shutting-off the compressed air which is done by reversing the starting lever Z into the position shown by Figs. 2 and 5, whereby the rod N and the lever P are released allowing the valve R' to be raised by its spring, closing the air inlet U and venting the pipe V to the atmosphere so that the piston of the valve W may lower onto its seat. The change-over lever P, Fig. 1, is then swung into the position indicated by dotted lines. In this position, the cam shaft D is moved by the lever arm Q to the right, bringing the cams E and E' out of line with air starting valve rods C and C' and into position to engage the exhaust valve push-rods which are represented in somewhat diagrammatic style at F and F'. The gear on the cam-shaft whereby the cross shaft G is rotate does not partake of this movement, being slidably mounted on said shaft D to rotate therewith. By the same movement of the lever P the pump stop rod N is moved by the lever arm R into its upper position in which the pumps are thrown in. At the same time, the valve R' is held in its uppermost position (Fig. 2) by spring action in which position it prevents the compressed air from passing into the pipe V.

An immediate return from the working position into the stop position can be attained by returning the lever P into the position indicated by full lines in Fig. 1, yet no possibility exists for changing-over directly into a position in which compressed air is admitted.

In internal combustion engines of the present type which are run by airless injection, a certain increase of pressure is produced during the combustion. The measure adopted for sake of security to prevent an inadmissible increase of the combustion pressure must therefore be particularly reliable, i. e. they must be of simple construction and capable of being easily operated.

It is more particularly necessary: first, that the supply of fuel is excluded, during the starting by means of compressed air, in order to avoid accumulations of fuel which would entail inadmissible increases of pressure at the first self-ignitions; secondly, that the changing-over from compressed air to combustion working will only be possible when the conduit feeding the starting air has been closed; and, third, that a direct unintentional changing-over from the position for working by combustion to the compressed air starting position is rendered impossible in order to prevent the engine from being re-started too early. These conditions and requirements are fulfilled in a novel and most simple manner by the described valve and fuel pump gears with which the engine is provided according to the present invention.

With regard to the well-known arrangement of one single lever for the changing-over and starting operation which passes through all three positions—viz. stopping, starting and working position—the present arrangement in the valve and pump gears of separate changing-over and starting levers possesses the advantage that in spite of their short throw which facilitates the control, these levers require the exertion of but little force for their operation. Another advantage of the present arrangement resides in that it securely prevents an accidental direct changing-over from the working position into the starting position.

Having thus described our invention what we claim as new and desire to secure by letters patent, is:—

1. An internal combustion engine of the fuel injection type having, in combination, a plunger fuel pump, means for reciprocating said plunger of said pump in timed relation to the engine speed, mechanisms for admitting compressed air to a cylinder of said engine for starting the latter and rendering said pump inoperative to inject fuel into said cylinder including a control member for said pump and a control member for the starting-air admitting mechanism, said starting-air admitting mechanism including an admission valve operated in timed relation to the engine speed, a supply valve for the starting-air supplied said admission valve, and a control valve for said supply valve, said control valve being operatively positively actuated by said control member for said starting-air admitting mechanism, and means automatically locking one of said control members in selected position when the other of said control members is moved to a selected position.

2. An internal combustion engine of the fuel injection type having, in combination, a plunger fuel pump, means for reciprocating said plunger of said pump in timed relation to the engine speed, mechanisms for admitting compressed air to a cylinder of said engine for starting the latter and rendering said pump inoperative to inject fuel into said cylinder including a control member for said pump and a control member for the starting-air admitting mechanism, said starting-air admitting mechanism including an admission valve operated in timed relation to the engine speed, a supply valve for the starting-air supplied said admission valve, and a control valve for said supply valve, said control valve being operatively positively actuated by said control member for said starting-air admitting mechanism, and means including interlocking mechanism between said control members for preventing operation of said control valve when said control member for said pump is in position to render the latter operative to inject fuel into said cylinder.

3. An internal combustion engine having, in combination, a starting valve for admitting starting-air to the engine cylinder, a cam driven by the engine for actuating said valve, controllable means for rendering said cam operative or inoperative to actuate said valve, a supply valve for the starting-air supplied said starting valve, a control valve for said supply valve, said control valve being operatively positively actuated by said controllable means, a fuel injection pump driven by said engine, controllable means for rendering said pump operative or inoperative to inject fuel, and means for coordinately actuating said controllable means for said starting valve and pump for rendering said cam operative when said pump is rendered inoperative and for rendering said cam inoperative when said pump is rendered operative.

4. An internal combustion engine having, in combination, starting means for the engine including a control member for said means, a fuel injection pump having a by-pass valve for rendering said pump inoperative to inject fuel, valve mechanism and a cam shaft for actuating the same, means for coordinately shifting said cam shaft for rendering said valve mechanism operative and inoperative and for opening and closing said by-pass valve for said pump, said last mentioned means including a cam shaft shifting member, and interlocking connections between said control member for said starting means and said means for shifting said cam shaft and opening and closing said by-pass valve effective to lock said cam shaft shifting member in predetermined position relative to said control member when the latter is in a predetermined position.

5. A Diesel-type engine having, in combination, compressed air-starting means, engine valves, a cam shaft for actuating said valves, said cam shaft being longitudinally shiftable for rendering said valves operative or inoperative, a fuel injection pump having a by-pass valve for rendering said pump inoperative, means including a hand lever for shifting said cam shaft and operating said by-pass valve, a remotely controlled valve for said compressed air-starting means, means including an auxiliary valve and an operating mechanism therefor for actuating said remotely controlled valve, and automatically acting interlocking mechanism between said means for shifting said cam shaft and operating said by-pass valve and said operating mechanism for said auxiliary valve whereby when said auxiliary valve is in position to cause opening of said remotely controlled valve said by-pass valve is held open and when said by-pass valve is closed said auxiliary valve cannot be moved to such position.

6. An internal combustion engine having, in combination, a fuel injection pump having a by-pass valve for rendering said pump operative or inoperative to inject fuel, an actuating member for opening and closing said valve, starting means comprising a compressed air-controlling valve, a manually operative auxiliary valve for causing actuation of said controlling valve, manually operated actuating mechanism for said auxiliary valve, said manually operated mechanism and said actuating member for said by-pass valve being mutually engageable for preventing opening of said by-pass valve when said auxiliary valve is in position to cause opening of said controlling valve and to prevent said auxiliary valve being moved to such position when said by-pass valve is closed.

7. An internal combustion engine having, in combination, a fuel pump having a reciprocatory plunger element and a reciprocatory by-pass valve element, a rocker arm for reciprocating said elements, means for oscillating said rocker arm with constant amplitude, an eccentrically mounted pivot for said rocker arm, mechanism for rotating said pivot for varying the length of stroke of one of said elements without varying the stroke of the other, starting means including a compressed air-controlling valve, and manually operated mechanism for causing actuation of said controlling valve, said manually operated mechanism and said mechanism for rotating said pivot being mutually engageable for holding said pivot in predetermined angular position when said controlling valve is opened and preventing movement of said controlling valve from closed to open position when said pivot is in another angular position.

8. An internal combustion engine having, in combination, a fuel injection pump having a by-pass valve for rendering said pump inoperative, means including a reciprocatory rod for actuating said by-pass valve, starting means having a controlling valve, manually operated mechanism for causing actuation of said controlling valve including a rotatable member, said rotatable member and said rod having cooperating portions for locking one to the other when in predetermined relative positions, whereby when said manually operated mechanism is moved to a position which causes opening of said controlling valve said rod will be locked in the position in which it opens said by-pass valve and when said rod is moved to its position in which it closes said by-pass valve said manually operated mechanism is locked against movement to its position in which it causes opening of said controlling valve.

9. An internal combustion engine having, in combination, a fuel injection pump having a by-pass valve for rendering said pump inoperative, means including a reciprocatory rod for actuating said by-pass valve, starting means having a controlling valve, manually operated mechanism for causing actuation of said valve including a segment rotatable about a pivot parallel to said rod, said segment having a peripheral notch adapted to register with said rod and permit longitudinal movement thereof while preventing rotation of said segment, said rod having a transverse notch adapted to engage with said segment to prevent longitudinal movement of said rod while permitting rotation of said segment, whereby to enforce closure of said by-pass valve when said controlling valve is open and to prevent opening of said controlling valve when said by-pass valve is closed.

10. An internal combustion engine having, in combination, a fuel injection pump having a by-pass valve for rendering said pump inoperative, means including a reciprocatory rod for actuating said by-pass valve, starting means having a controlling valve, manually operated mechanism for causing actuation of said controlling valve including a rotatable member, said rotatable member and said rod having cooperating portions for locking one to the other when in predetermined relative positions, whereby when said manually operated mechanism is moved to a position which causes opening of said controlling valve said rod will be locked in the position in which it opens said by-pass valve and when said rod is moved to its position in which it closes said by-pass valve said manually operated mechanism is locked against movement to its position in which it causes opening of said controlling valve, a longitudinally shiftable cam shaft, a manually operated lever positively connected to said cam shaft and to said rod, and engine valves selectively operated by said shaft in accordance with its longitudinal position.

11. An internal combustion engine having, in combination, starting means having control mechanism including an air-starting control valve, a fuel injection pump, a by-pass valve for rendering said pump operative or inoperative to inject fuel, a regulating rod for said by-pass valve, means including an oscillatable sector for actuating said control valve, said sector and rod having cooperating portions for locking them in predetermined relative positions for causing said fuel pump to be inoperative to inject fuel when said starting means is operative and said starting means to be inoperative when said fuel pump is operative to inject fuel.

12. An internal combustion engine having, in combination, starting means having control mechanism including an air-starting control valve, a fuel injection pump, a by-pass valve for rendering said pump operative or inoperative to inject fuel, a regulating rod for said by-pass valve, means including an oscillatable sector for actuating said control valve, said sector and rod having cooperating portions for locking them in predetermined relative positions for causing said fuel pump to be inoperative to inject fuel when said starting means is operative and said starting means to be inoperative when said fuel pump is operative to inject fuel, a pair of engine valves including a starting-air admission valve, cam means for actuating said valves, a manually operated lever for selectively causing said cam means to operate each of said valves to the exclusion of the other, said manually operated lever positively connected to said by-pass valve regulating rod for actuating the latter.

13. A Diesel-type engine having, in combination, starting mechanism including an admission valve, means for operating said valve including a cam shaft, means including a manually operated lever for shifting said cam shaft longitudinally for rendering said admission valve operative or inoperative, a fuel injection pump having a by-pass valve for rendering said pump operative or inoperative to inject fuel, means including a control rod for operating said by-pass valve, said control rod being operatively positively connected to said lever for causing said by-pass valve to be in open position when said cam shaft is shifted to its position in which it renders said admission valve operative, valve means for supplying compressed air to said admission valve, manually operative mechanism for actuating said valve means, means for automatically locking said control rod for said by-pass valve and said manually operative mechanism for said valve means to each other when in predetermined relative positions for permitting operation of said admission valve and opening of said by-pass valve only when said valve means is in position to supply compressed air to said admission valve.

14. A Diesel-type engine having, in combination, starting mechanism including an admission valve, an engine exhaust valve, engine driven cam means for actuating said valves, means including a manually operated member for adjusting said cam means for causing either of said valves to be operated to the exclusion of the other, a fuel injection pump having a by-pass valve for rendering said pump operative or inoperative to inject fuel, means including a longitudinally shiftable rod for opening and closing said by-pass valve, said rod operatively positively connected to said manually operated member for causing said by-pass valve to be open when said cam means causes operation of said admission valve, valve means for supplying compressed air to said admission valve, and means for automatically locking said valve means and said longitudinally shiftable rod to each other when in predetermined relative positions for permitting opening of said valve means only when said manually operated member is in its position in which it causes said admission valve to be operated.

In testimony whereof we have signed our names to this specification.

JACQUES RUBINSTEIN.
VICTOR HEIDELBERG.
EMIL UHLHORN.
WILHELM DAHNERS.